(12) United States Patent
Gable

(10) Patent No.: US 6,860,197 B2
(45) Date of Patent: Mar. 1, 2005

(54) FOOD INJECTION DEVICE

(76) Inventor: Derek J. Gable, 7246 Avenida Altisma, Rancho Palos Verdet, CA (US) 90275

( * ) Notice: Subject to any disclaimer, the term of this patent is extended or adjusted under 35 U.S.C. 154(b) by 81 days.

(21) Appl. No.: 10/282,147

(22) Filed: Oct. 29, 2002

(65) Prior Publication Data

US 2004/0079240 A1 Apr. 29, 2004

(51) Int. Cl.$^7$ ............................. A47J 25/00; A47J 17/00
(52) U.S. Cl. ........................ 99/538; 99/450.8; 99/494; 99/515; 99/428; 30/113.3; 30/113.1
(58) Field of Search ............................. 99/538, 450.8, 99/537, 515, 544, 428, 494, 353, 354; 30/113.3, 113.1

(56) References Cited

U.S. PATENT DOCUMENTS 1,917,137 A * 7/1933 Phillip ....................... 99/450.7
2,118,976 A * 5/1938 Larkin ....................... 30/113.3

* cited by examiner

Primary Examiner—Reginald L. Alexander

(57) ABSTRACT

Food Injection Device has an injection tube member and integral handle, and a piston holding stand. The tube member is rigid and has a thin wall structure capable of piercing and penetrating a variety of food items and retaining the food items for future deposit into a second food item. The piston is positioned within the piston holding stand in such a way that the injection tube can fit over the piston and be retained by the piston holding stand so that when the tube handle is pushed down, the tube moves down the stationary piston and the food item within the tube is prevented from moving by the piston and is therefore left within the second food item. A preferred embodiment includes a variety of shaped injection tubes such as heart shaped, star shaped, and circular shaped.

4 Claims, 8 Drawing Sheets

FOOD INJECTION DEVICE

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of food preparation devices and more specifically a to food injection device.

It is well known that combinations of food products add the the pleasurable dining experience from a flavor and visual appearance standpoint.

Many different ways of accomplishing this are currently used including spreading one food on another, mixing one food with another, sandwiching foods together, and even injecting a liquid food into a more solid food.

However, there is no injection method available today that helps a user to easily inject a first, relatively solid food, into a second relatively solid food thereby intimately commingling the flavors of both foods and providing a unique, attractive appearance of one food inserted into another.

BRIEF SUMMARY OF THE INVENTION

The primary object of the invention is to provide a food injection device that allows a user to combine one food with another in a novel way.

Another object of the invention is to provide a food injection device that allows two separate food items to retain their individual integrity yet be intimately commingled at the same time.

Another object of the invention is to provide a food injection device that can be easily modified to inject a variety of shapes of a first food item into a second food item.

A further object of the invention is to provide a food injection device that helps enhance the flavor of a food by combining one food with another.

Yet another object of the invention is to provide a food injection device that helps improve the visual appearance of a food item or items.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a Food Injection Device comprising: an injection tube member and integral handle, a piston, and a piston holding stand, said tube member being rigid and having a thin wall structure capable of piercing and penetrating a variety of food items and retaining said food items for future deposit into a second food item, said piston positioned within said piston holding stand is such a way that said injection tube can fit over said piston and be retained by said piston holding stand so that when the tube handle is pushed down, the tube moves down the stationary piston and the food within the tube is prevented from moving by the piston and is therefore left within the second food item.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
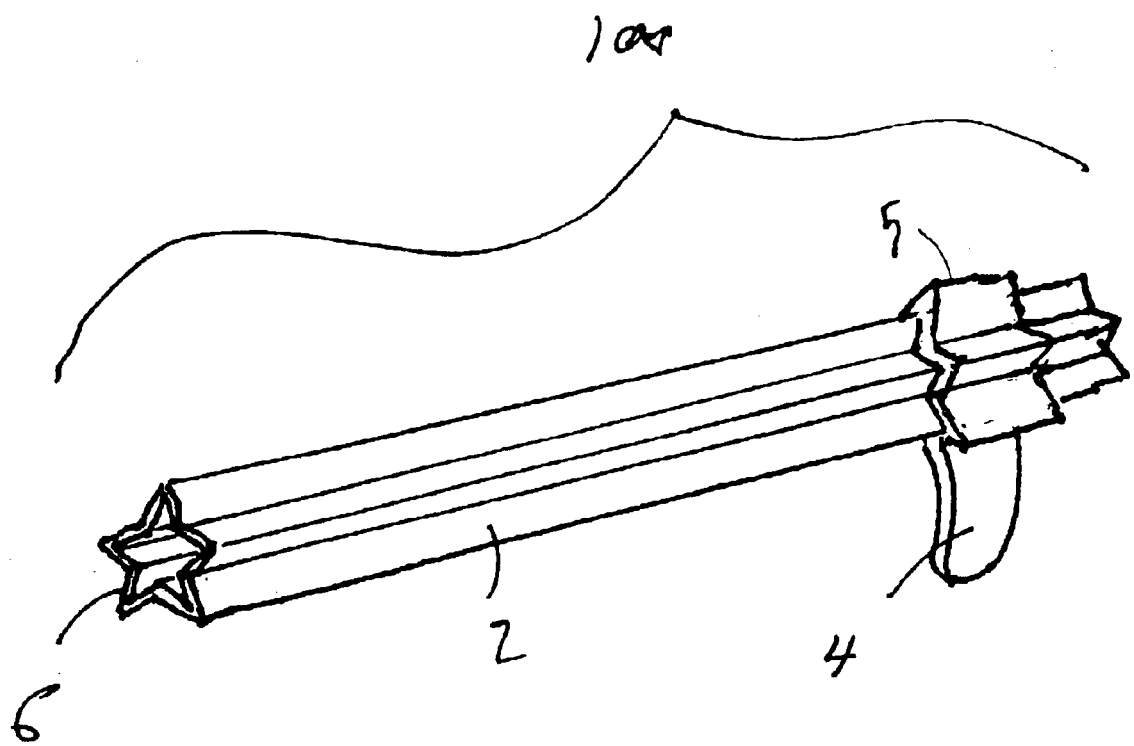
FIG. 1 is a perspective view of the injector tube of the present invention.
Figure 2:
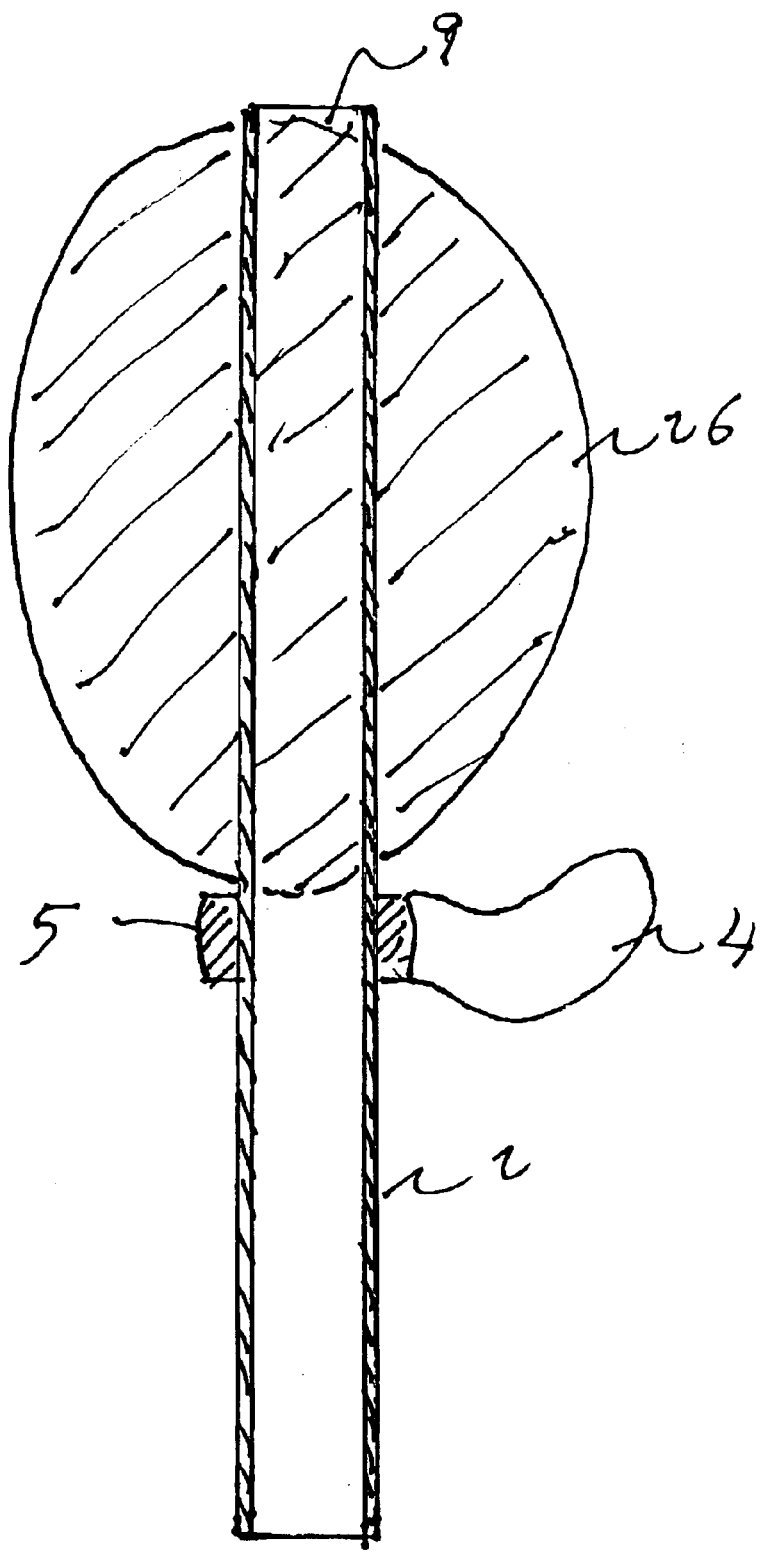
FIG. 2 is a side section view of the injector tube fully inserted into a first food item.
Figure 3:
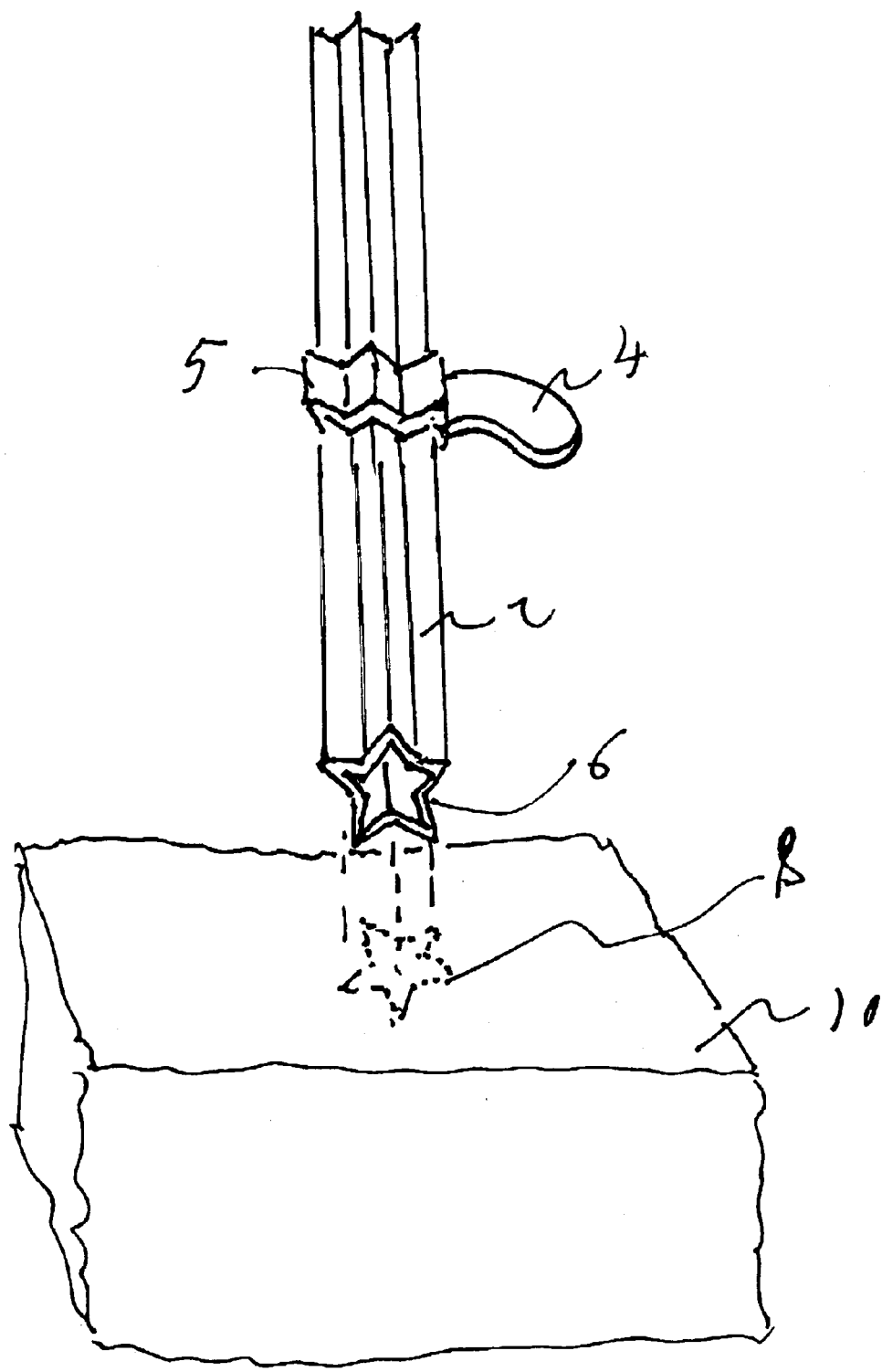
FIG. 3 is a perspective view of the injector tube about to be inserted into a second food item.
Figure 4:
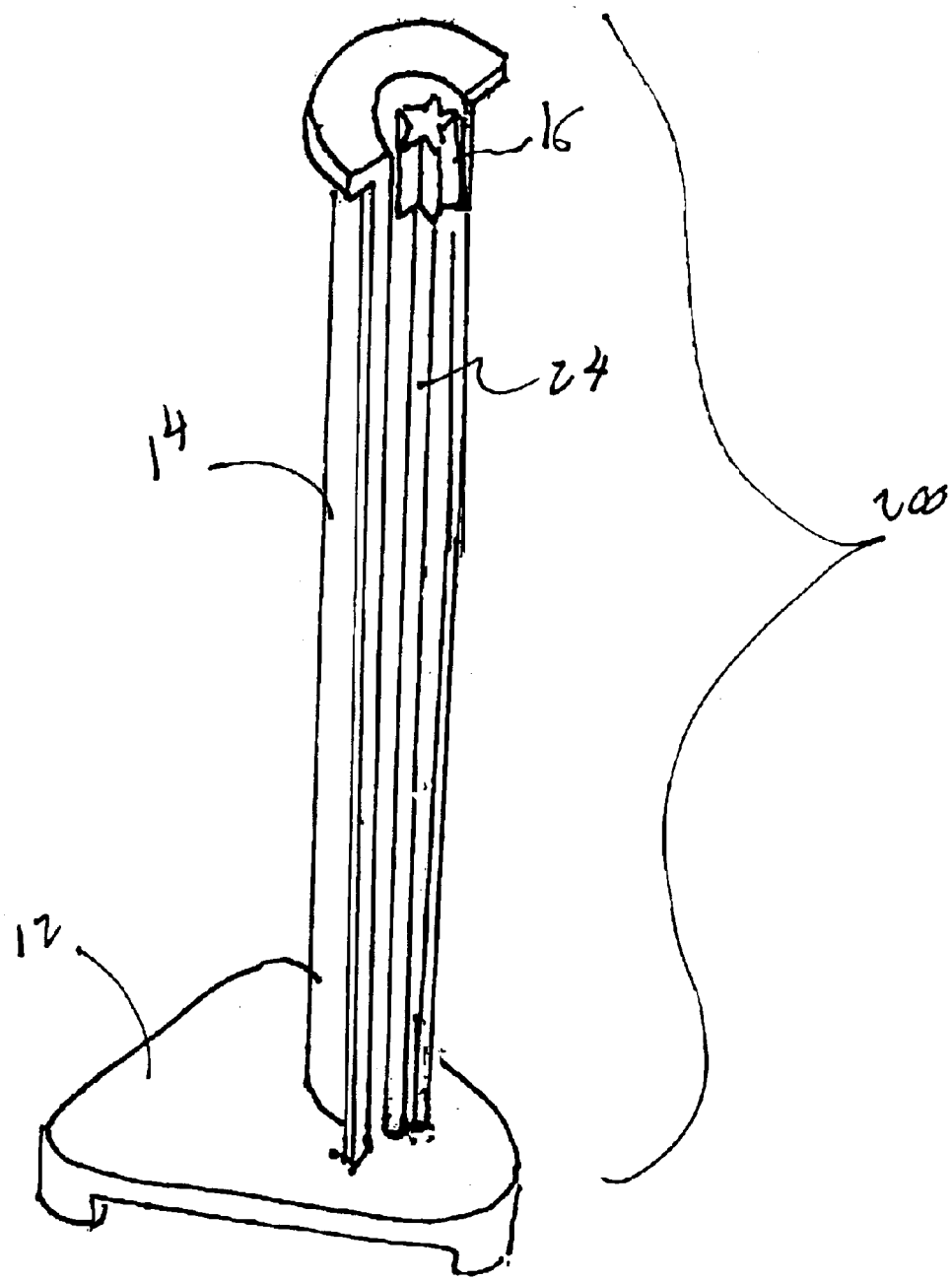
FIG. 4 is a perspective view of the piston in place inside the piston holding assembly.
Figure 5:
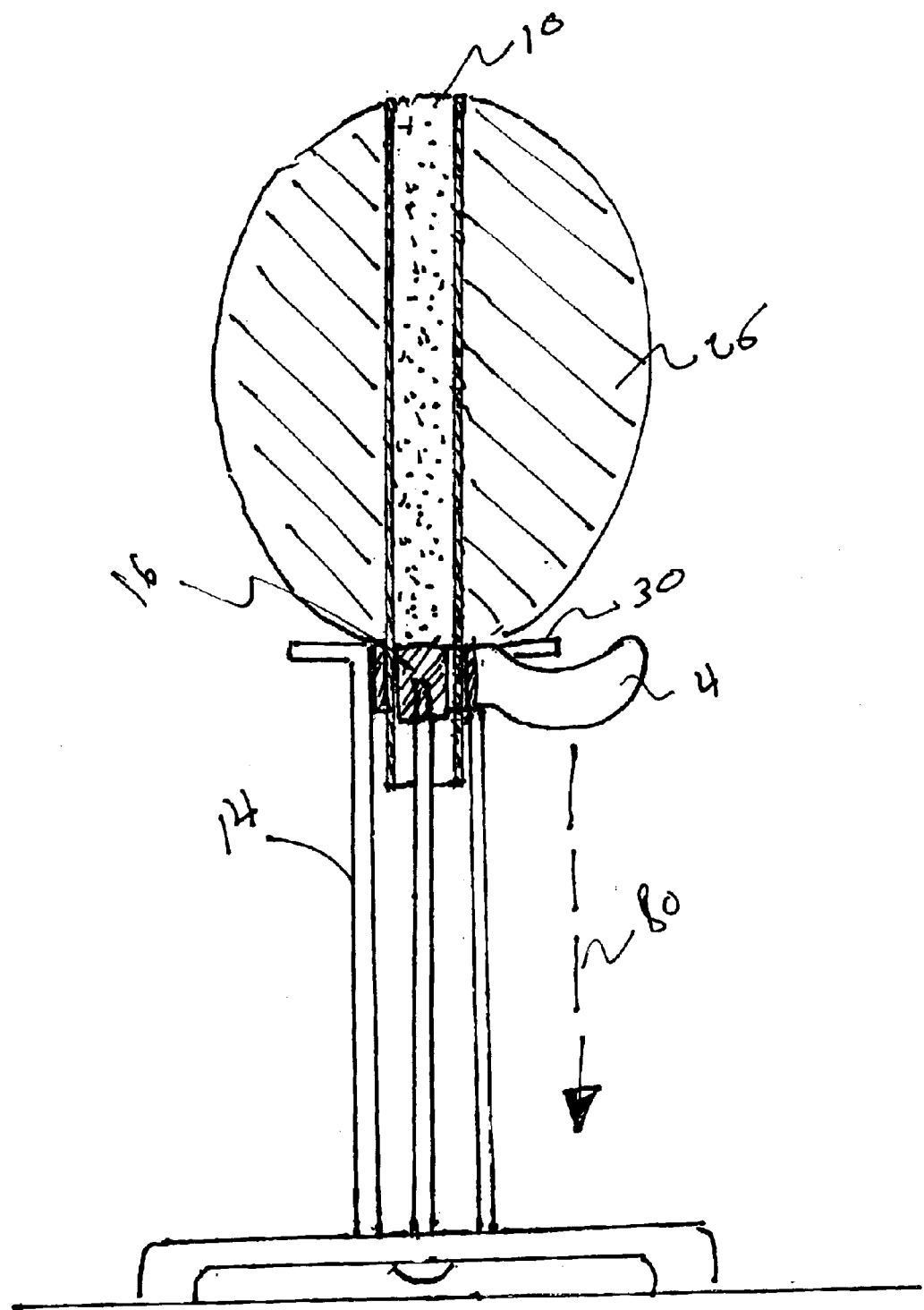
FIG. 5 is a side section view of the present invention where the injection tube housing a second food has been inserted into a first food.
Figure 6:
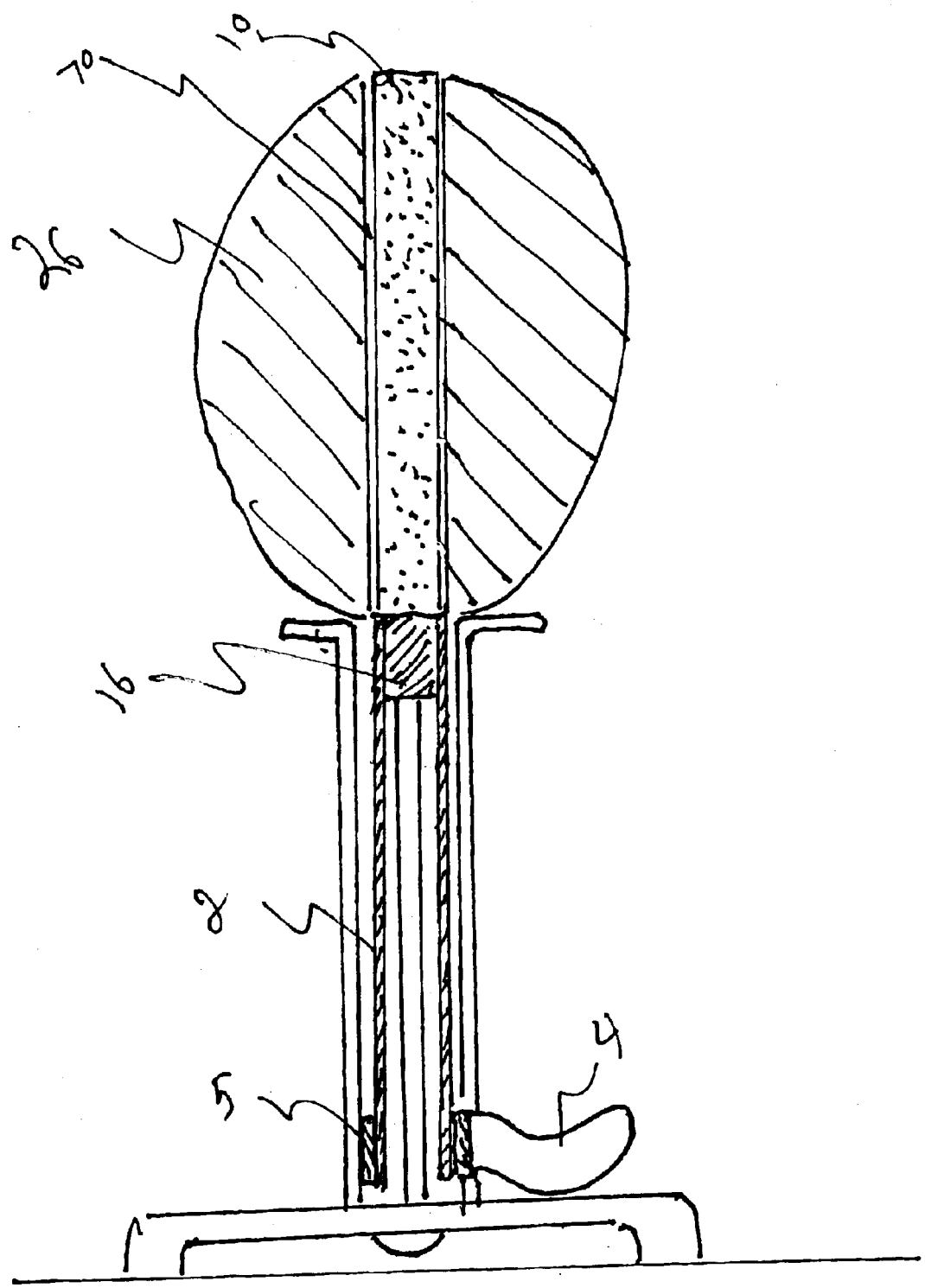
FIG. 6 is a section view of the piston fully retracted and a first food item with a second food item remaining fully inserted into it.
Figure 7:
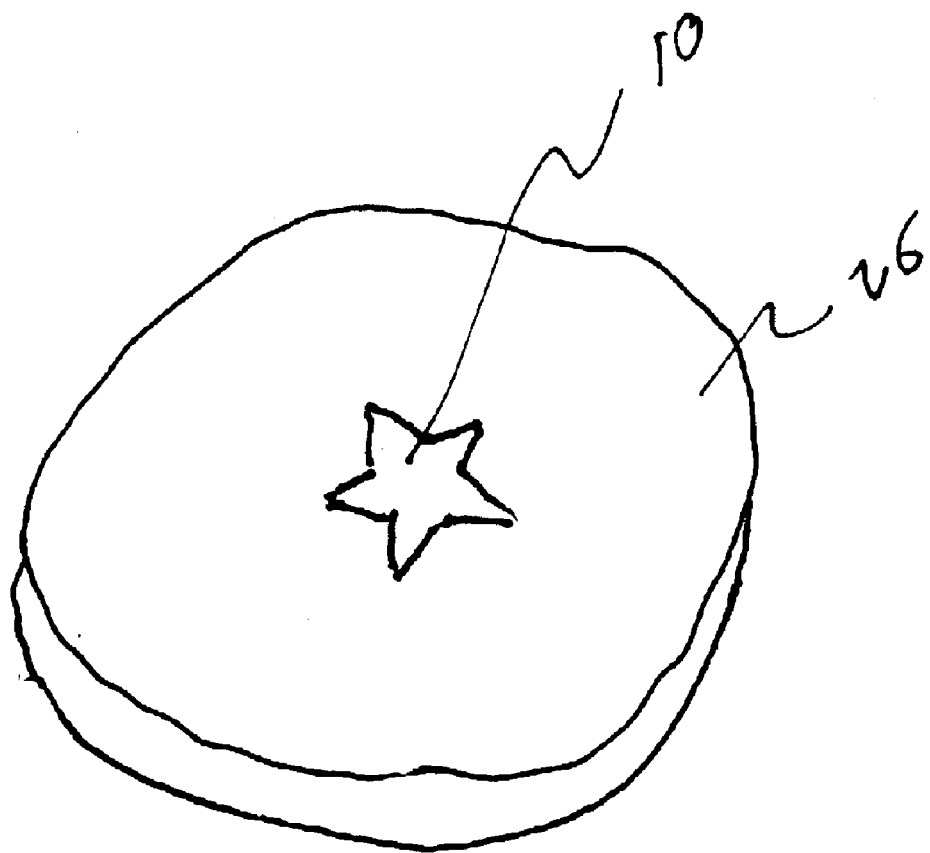
FIG. 7 is a perspective view of a slice of a second food item with a first food item installed within it.
Figure 8:
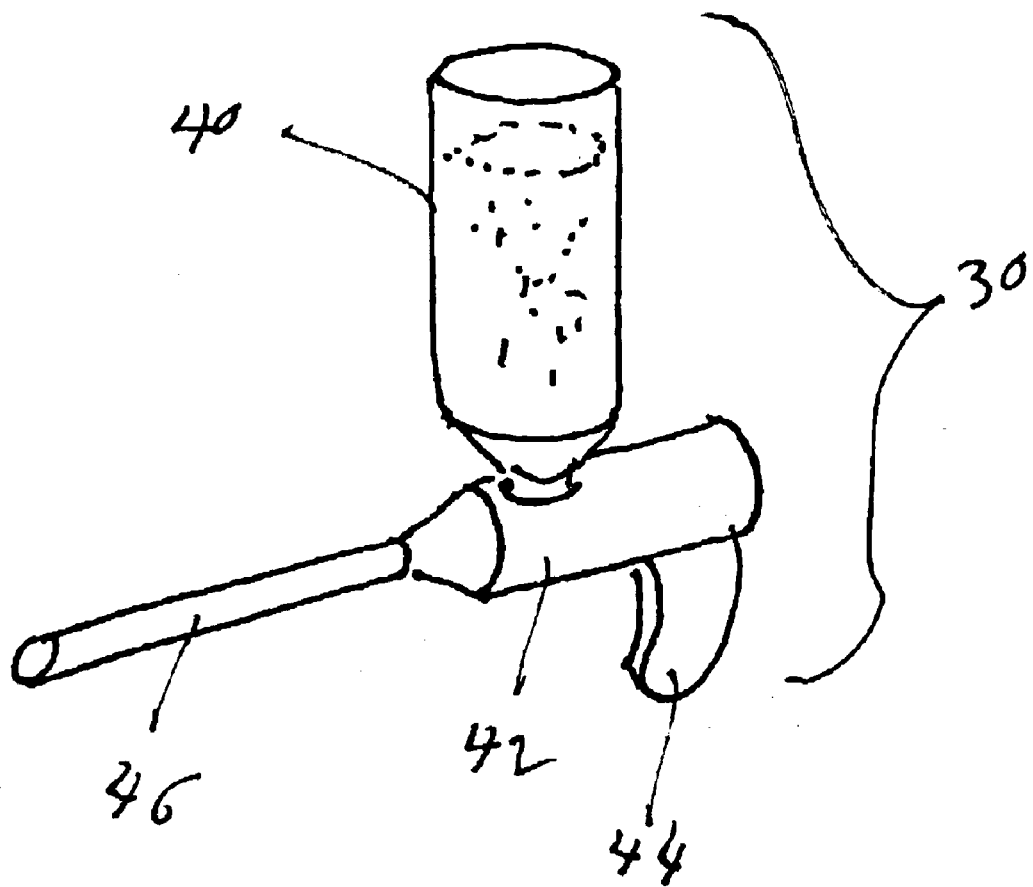
FIG. 8 is a perspective view of an alternate tube assembly for use with liquid or semi liquid foods.

Referring now to FIG. 1 we see a perspective view of the injection tube assembly 100 of the present invention. The tube 2 is constructed of rigid thin walled material such as food grade plastic or stainless steel. The tube 2 may be extruded or or injection molded or it may be bent as in the case of a sheet metal construction. A handle 4 is snuggly but slidably attached by an integral collar 5 to the tube 2 as shown. In this case the extruded tube 2 is star shaped as shown by tip 6, but can alternately be other shapes such as a heart, diamond or the like. FIG. 2 shows the tube assembly 100 after it has been inserted into a potato 26 causing a portion 9 of the potato 26 to be separated from the main body of the potato 26. The user then slides handle surrounding collar 5 up to the bottom of potato 26. The user then withdraws the tube 2 and ejects the potato portion 9 from tube 2 by use of any long thin object that is capable of being inserted into the tube 2. The user may also choose to use rod 24 and piston 16, shown in FIG. 4, to push out potato 9 as the piston assembly can be removed and replaced from the piston stand assembly 200. In the present example as shown in FIG. 3 the user pushes tube 2 into a block of cheese 10. The cheese is forced into tube 2 and resides there until the next step in the food injection procedure. FIG. 4 shows a perspective view of the piston holding stand assembly 200 of the present invention. The holding stand 200 is comprised of a base 12, a support structure 14, a piston rod 24 and removably attachable piston 16. Piston 16 is the same general star shape as injection tube 2 and is dimensioned to slidably fit within injection tube 2. It should be noted that tube 2 and piston 16 can be any one of a variety of shapes such as circular, heart shaped, diamond shaped, and the like. Piston 16 fits onto rod 24 by means of male and female threads or other standard means of removable attachment so that the piston shape 16 can be easily replaced by other shapes depending on the shape injection tube 2. FIG. 5 shows injection tube assembly set onto piston stand 200. The user then pushes down on handle 4 as shown in dotted line 80 thereby causing tube 2 along with handle 4 to lower. As tube 2 is slid down to base 12, cheese portion 10 remains in potato 26 because piston prevents the cheese 10 from sliding down. FIG. 6 shows tube 2 after it has been completely slid down leaving cheese 10 within potato 26 with a small gap 70 remaining. Gap 70 is small enough that cheese 10 will not easily slip from potato 26. FIG. 7 shows a slice of potato 26 after cheese portion 10 has been inserted as described above. The resulting combination provides a unique flavor experience as well as a unique visual experience. Of course the number of food combinations and shapes that can ultimately be prepared by the present invention are limitless. FIG. 8 shows an alternate embodiment to tube assembly 2 as shown as assembly 30 wherein a liquid holding reservoir 40 is made of a squeezable plastic so that the user can inject a liquid or semi liquid food item into food in a similar way to that described above.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A Food Injection Device comprising:
   an injection tube member with integral handle;
   a piston; and
   a piston holding stand;
   said injection tube member being rigid and having a thin wall structure capable of piercing and penetrating a variety of food items and retaining said food items for future deposit into a second food item;
   said piston being positioned within said piston holding stand in such a way that said injection tube can fit over said piston and be retained by said piston holding stand so that when a second food item is pushed onto said injection tube, the first food item located inside the injection tube member is inserted into said second food item.

2. The Food Injection Device as claimed in claim 1 further comprising an additional alternate food injection tube that includes a liquid holding reservoir so that liquid foods can be injected into more solid foods.

3. A Food Injection Device comprising:
   an injection tube member with integral handle;
   a piston; and
   a piston holding stand;
   said injection tube member being rigid and having a thin wall structure capable of piercing and penetrating a variety of food items and retaining said food items for future deposit into a second food item;
   said piston positioned within said piston holding stand in such a way that said injection tube can fit over said piston and be retained by said piston holding stand so that when a second food item is rushed onto said injection tube, the first food item located inside the injection tube member is inserted into said second food item wherein said injection tube member is selected from a group comprising a plurality of shaped injection tubes such as heart shaped, star shaped, and circular shaped allowing the user to select the shape desired of said first food and its resulting appearance within said second food when said second food is sliced thereby revealing said first food shape neatly placed within said second food.

4. A Food Injection Device comprising:
   an injection tube member with integral handle;
   a piston; and
   a piston holding stand;
   said injection tube member being rigid and having a thin wall structure capable of piercing and penetrating a variety of food items and retaining said food items for future deposit into a second food item, said injection tube member being part of an assembly which includes a snugly fitting but slidable collar and attached handle that can be slid with respect to the collar so that the collar is positioned just under the first food item;
   said piston being positioned within said piston holding stand in such a way that said injection tube can fit over said piston and be retained by said piston holding stand so that when a second food item is gushed onto said injection tube, the first food item located inside the injection tube member is inserted into said second food item so that said handle can be used by the user to help pull down said injection tube that causes said second food item to be retained in place within said first food item.

* * * * *